United States Patent
Pittman et al.

[15] 3,653,956
[45] Apr. 4, 1972

[54] FLUORINATED EPOXIDES AND USE THEREOF

[72] Inventors: Allen G. Pittman, El Cerrito; William L. Wasley, Berkeley, both of Calif.

[73] Assignee: The United States of America as represented by the Secretary of Agriculture

[22] Filed: Dec. 22, 1969

[21] Appl. No.: 887,380

[52] U.S. Cl. ............... 117/139.5 A, 117/138.8 A, 117/141, 117/143 A, 117/155 R, 117/161 ZA
[51] Int. Cl. .......................................................D06m 13/68
[58] Field of Search ........... 117/139.5 CQ, 139.5 A, 138.8 B, 117/138.8 A, 161 ZB, 143 A, 155 R, 141

[56] References Cited

UNITED STATES PATENTS 3,361,685    1/1968    Pittman et al. .................... 117/161 X Primary Examiner—William D. Martin
Assistant Examiner—Theodore G. Davis
Attorney—R. Hoffman, W. Bier and W. Takacs

[57] ABSTRACT

1,4-bis-(heptafluoroisopropoxy)-2-butene is oxidized to form the corresponding epoxide

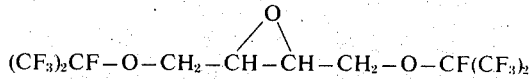

This epoxide can be converted into homo- or co-polymers which are useful for enhancing the repellency of fibrous substrates, e.g., fabrics made from natural or synthetic fibers.

7 Claims, No Drawings

FLUORINATED EPOXIDES AND USE THEREOF

Intermediates used in the preparation of the products of this invention are disclosed in our patents and applications identified as follows: U.S. Pat. No. 3,361,685, and the division thereof Ser. No. 666,530, filed July 26, 1967, now U.S. Pat. No. 3,304,000; U.S. Pat. No. 3,420,793 and the divisions thereof—Ser. No. 736,882, filed Apr. 17, 1968, now U.S. Pat. No. 3,484,470, Ser. No. 791,833, filed Nov. 25, 1968, now U.S. Pat. No. 3,574,771 and Ser. No. 823,197, filed Dec. 4, 1968, now U.S. Pat. No. 3,528,850.

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the provision of new organic compounds, including 1,4-bis-(heptafluoroisopropoxy)-2,3-epoxy-butane, and the polymers thereof. The objects of the invention also include methods for synthesizing these compounds, procedures for treating fibrous materials with the compounds, and the treated materials as new articles of manufacture.

Further objects of the invention will be evident from the following description wherein parts and percentages are by weight unless otherwise specified.

Note: In the following description, the perfluoroisopropyl radical

(also known as the heptafluoroisopropyl radical), will be designated by the symbol Q.

In our U.S. Pat. No. 3,361,685, we describe polymers derived from heptafluoroisopropyl glycidyl ether

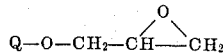

Although these polymers are useful to enhance the oil repellency of fabrics, they do not provide the high level of oil repellency necessary for many applications.

One of the objects of the invention is to remedy the problem outlined above, that is, to provide novel polymers which are useful to provide fibrous materials with greater oil repellency than attainable with the polymers of the aforesaid glycidyl ethers.

THE NEW MONOMER

The novel monomer of the invention has the structure (I)
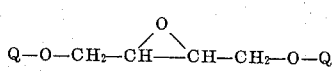

A critical aspect of this compound is the presence of the heptafluoroisopropyl radical (II)

(represented by Q in Formula I) and especially in the fact that it contains a fluorine group in alpha position, that is, on the secondary carbon (marked by an asterisk in Formula II, above). The unique structure of this radical provides the advantage that it confers a greater degree of oleophobicity for a given number of fluorinated carbon atoms than with other arrangements of fluorinated carbon atoms in straight chains, or even in branched chain structures which do not include the alpha-fluoro arrangement. In fact, our investigations have shown that three fluorinated carbon atoms in our arrangement provide a degree of oleophobicity equivalent to six or seven fluorinated carbon atoms in a straight chain or other structure which lacks the critical alpha-fluoro configuration.

A particularly critical point of the monomer of the invention is that it contains two of the heptafluoroisopropyl groups per molecule, whereby the compound is outstandingly effective in conferring oleophobic properties to fibrous materials such as textiles treated therewith. Another important aspect of the invention is that the

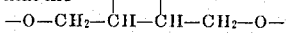

portion of the compound provides effective isolation of the perfluoroisopropyl groups from the epoxy group. As a result, the compound is stable and will undergo typical polymerization reactions, unaffected by the fluorine-containing "tails." Accordingly, the compound can be converted into various polymeric derivatives useful for a wide variety of uses, particularly the treatment of textiles and other fibrous materials. A further important point is that the aforesaid bridging group, containing only four carbon atoms, does not annul the oleophobic effect of the heptafluoroisopropyl groups. Thus, when the polymers of the invention are applied to (or formed on) textiles or other fibrous materials, the fluorinated groups are still relatively close to the polymer backbone, whereby they can provide a high degree of oleophobicity to the treated fibrous substrate.

PREPARATION OF THE MONOMER

In preparing the monomer of the invention, 1,4-bis-(heptafluoroisopropoxy)-2-butene is subjected to oxidation. (The preparation of the aforesaid starting compound is described in our U.S. Pat. No. 3,420,793, and claimed in the divisional application Ser. No. 791,833, filed Nov. 25, 1968.)

The following equation illustrates the reaction:

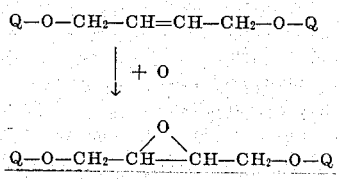

The oxidation is carried by reacting the olefinic starting material with a peroxy compound such as perbenzoic acid, tert-butyl hydroperoxide, metachloroperbenzoic acid, ascaridole, or acid or alkaline hydrogen peroxide. The reaction is generally conducted at a temperature of about 30° to 100° C., and preferably in the presence of an inert solvent such as dichloromethane, chloroform, carbon tetrachloride, glacial acetic acid, petroleum hydrocarbon distillates, and the like. After completion of the oxidation, the epoxide derivative may be recovered by removing the spent peroxy compound, applying a reducing agent such as $Na_2SO_3$ or $NaHSO_3$ to destroy remaining peroxy activity, and subjecting the material to distillation under reduced pressure.

PREPARATION OF POLYMERS

The monomer of the invention can be formed into homopolymers or copolymers by application of standard polymerization techniques used with other epoxides. Homopolymers can be prepared, for example, by heating the monomer at about 70°–100° C. in the presence of a Lewis acid such as boron trifluoride, ferric chloride, boron trifluoride-etherate, aluminum chloride, antimony pentachloride, phosphorus trichloride, or similar catalysts. In the alternative, alkaline substances such as KOH, sodium methoxide, triethyl amine, etc. may be used. Also useful are the coordination catalysts such as triethyl aluminum/co-catalyst, diethyl zinc/co-catalyst, etc., where the co-catalyst is an alcohol, ketone, or water. Copolymers may be prepared by applying the same procedure to a mixture of the monomer of the invention plus a different epoxide monomer such as ethylene oxide, propylene oxide, epichlorohydrin, styrene oxide, glycidyl acrylate, allyl glycidyl ether, or the fluorinated glycidyl ethers described in our U.S. Pat. No. 3,361,685, typically heptafluoroisopropyl glycidyl ether. In general, the polymers of the invention range from viscous liquids to semi-solid or solid materials; they are soluble in fluorinated solvents such as benzotrifluoride, 1,3-bis-(trifluoromethyl) benzene, trichlorotrifluoroethane, and the like, but poorly soluble or even insoluble in common solvents such as benzene, toluene, etc.

When the monomer of the invention is polymerized, the product has recurring units which may be represented as follows:

(III) 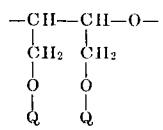

The polymers are useful to provide fibrous substrates with a high degree of oil repellency, because of the heptafluoroisopropyl groups (represented by Q in formula III), and particularly because these heptafluoroisopropyl groups are close to the —C—C—O— backbone and close to one another whereby they exert a maximum blocking action. This is in contrast to the polymers of our U.S. Pat. No. 3,361,685, i.e., (IV) 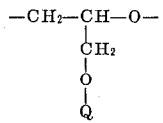

In these, the heptafluoroisopropyl groups are necessarily separated from one another with the result that a lesser degree of oil repellency is attained.

As hereinabove mentioned, the monomer of the invention may be copolymerized with other epoxides. When, for example, the other epoxide is an alkylene oxide, the resulting copolymer will contain units as shown in Formula III plus units of the type

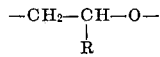

wherein R is H or lower alkyl. In the event that the other epoxide is heptafluoroisopropyl glycidyl ether, the copolymer will contain units as shown in Formula III plus those of Formula IV.

A special phase of the invention concerns the provision of copolymers which have the ability to confer on fibrous materials a desirable combination of properties as explained below.

In the manufacture of garments such as skirts, slacks, and other forms of apparel which are meant to be cleaned by washing in aqueous medium, it is desirable to have the fabric exhibit a combination of properties. These include a high level of oil repellency so that if oily or greasy substances contact the garment they will not spread on the surface nor penetrate into the fabric interstices. Concomitantly, it is desirable that if the material does become stained, these stains can be removed by washing. If the fabric exhibits a high level of hydrophobicity, the aqueous washing medium cannot properly wet the fabric, hence cannot remove the stains. This is a characteristic problem of many of the so-called wash-and-wear garments: If they become stained, it is very difficult to remove the stain, and the very purpose of the wash-and-wear garment to provide easy care is vitiated.

A particular object of the invention is to provide the means for remedying the problem outlined above. The invention provides copolymers which confer on fabrics a high degree of oil repellency so that they strongly resist staining by oily foods or the like, yet if they become soiled the stains can be readily washed out. This combination of a high level of oil repellency plus a decreased level of hydrophobicity is provided by the products prepared by copolymerizing the monomer of the invention with an alkylene oxide such as ethylene, propylene, or butylene oxide, or with a fluorinated glycidyl ether described in U.S. Pat. No. 3,361,685, e.g., heptafluoroisopropyl glycidyl ether. Typical in this area are copolymers of 10 to 100 moles of the alkylene oxide or glycidyl ether per 100 moles of the monomer of this invention.

APPLICATION TO FIBROUS MATERIALS

The compounds herein are particularly useful for the treatment of fibrous materials, such as textiles, in order to improve their properties, e.g., improve their oil-, water-, and soil-repellency. Moreover, these improvements are attained without detriment to other properties of the textile. For example, the treatment does not impair the hand of the textile. Another point is that the improvements are durable—they are retained despite laundering and dry cleaning of the treated fabrics. In practicing this phase of the invention, the polymer (i.e., a homo- or copolymer) is applied to the fibrous material in conventional manner. Typically, the polymer is dissolved in an inert volatile solvent, e.g., benzotrifluoride, 1,3-bis-trifluoromethyl benzene, or trichlorotrifluoroethane. The resulting solution is applied to the fibrous material by a conventional dip and pad technique. By varying the concentration of the polymer in solution and the degree of padding, the amount of polymer deposited on the material may be varied. Typically, the amount of polymer may be from 0.1 to 20 percent, based on the weight of fibrous material but it is obvious that higher or lower proportions can be used if desired. Usually, in treating textiles such as fabrics, the amount of polymer is limited to about 0.1 to 5 percent to attain the desired repellency without interference with the hand of the textile. In an alternative procedure, the polymers are applied to the fibrous material in the form of an aqueous emulsion.

After application of the polymer solution, the treated fibrous substrate is subjected to a conventional curing operation in order to bond the polymer to be fibers. As an example of such treatment, the fibrous material is heated in the range of about 50° to 150° C. for a period of 5 to 60 minutes. The solvent (from the polymer solution) may be evaporated in a separate step prior to curing or it may simply be evaporated during the curing operation.

Although the preformed polymers are usually applied to the fibrous material, the monomer may be applied as such in the form of a vapor, in the pure liquid form, or from solution in an inert volatile solvent. The treated fibrous material is then cured—for example, at 50°–150° C. for 5 to 60 minutes—to promote bonding of the monomer to the fibrous material and to effect the in situ polymerization of the monomer. To expedite the curing operation, one may add a conventional polymerization catalyst such as those listed above.

The invention may be utilized for improving the properties of all types of fibrous materials, for example, paper; cotton; linen; hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg albumin, collagen, or keratins; nylon; polyurethane fibers; polyester fibers such as polyethylene terephthalate; polyacrylonitrile-based fibers; or fibers of inorganic origin such as asbestos, glass, etc. The invention may be applied to textile materials which are in the form of bulk fibers, filaments, yarns, threads, slivers, roving, top, webbing, cord, tape, woven or knitted fabrics, felts or other non-woven fabrics, garments or garment parts.

EXAMPLES

The invention is further demonstrated by the following examples provided by way of illustration, not limitation.

The tests referred to in the examples were carried out as described below.

Water repellency: AATC spray test, method 22-1952. Ratings are from 0 to 100, with the higher values signifying greater resistance to water penetration.

Oil Repellency: The test used was the AATC Tentative Test Method 118-1966T. Ratings are from 0 to 8 with the higher values signifying the greater resistance to oil penetration. In particular, the oil-repellency rating is the highest-numbered test liquid which will not wet the fabric within a period of 30 seconds. The liquids and their corresponding numbers are:

| No. | Composition |
|---|---|
| 1 | "Nujol" |
| 2 | 65:35 "Nujol:" n-hexadecane by vol. |
| 3 | n-hexadecane |
| 4 | n-tetradecane |
| 5 | n-dodecane |
| 6 | n-decane |
| 7 | n-octane |
| 8 | n-heptane |

EXAMPLE 1—PREPARATION OF EPOXIDE-I, I.E., 1,4-BIS-(HEPTAFLUOROISOPROPOXY)-2,3-EPOXY-BUTANE

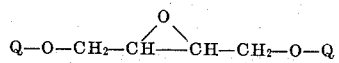

Into a 250-ml. round-bottomed flask were placed 40 grams of 1,4-bis-(heptafluoroisopropoxy)-2-butene, 20 grams of 87 percent active metachloro-perbenzoic acid, and 60 ml. of dichloromethane (solvent). The mixture was stirred and refluxed for one week. During this period gas chromatographic analysis revealed the continual conversion of the olefinic starting material into the corresponding epoxide. At the end of the stated period, solid metachlorobenzoic acid was filtered from the reaction mixture, and the filtrate washed successively with dilute aqueous solutions of $NaHSO_3$, $Na_2CO_3$, and finally plain water. After drying the washed filtrate over anhydrous $CaSO_4$, most of the dichloromethane solvent was removed on the steam bath. The crude product remaining (25 grams) was examined by gas chromatographic analysis and found to contain 60 percent of the desired epoxide, 21 percent solvent ($CH_2CL_2$), and 19 percent of residual olefinic starting material. Distillation under vacuum yielded the purified epoxide, b.p. 97°–98° C. at 35 mm. Hg. It is hereinafter referred to as Epoxide-I.

EXAMPLE 2—HOMOPOLYMERIZATION OF EPOXIDE-I

In order to test the efficiency of various catalyst systems, the monomer (Epoxide-I) was heated in the presence of selected catalysts in sealed glass tubes, using the procedure described in Part A.

A. Into a dry, 7-mm. Pyrex tube, sealed at one end, was inserted 24 mg. of anhydrous $FeCl_3$, followed by 0.75 gram of Epoxide-I. The tube was placed in Dry-ice, evacuated, and sealed while under vacuum. The sealed tube was warmed to room temperature, then placed in a steam bath for about 12 hours. An increase in viscosity was noted after several minutes of heating. At the end of the stated period, the material had completely solidified. The polymer was removed from the tube by dissolution in trichloro-trifluoroethane, and the solution was washed several times with dilute (0.1 N) aqueous HCl. Solvent was then removed on the steam bath, and the polymer dried in a vacuum oven at 80° C., 1 mm. Hg., for several hours before weighing to determine the percent of conversion. In this case, 0.5 gram (71 percent conversion) of a clear, light-brown solid polymer was obtained. It had a grease-like consistency, was soluble in such fluorine-containing solvents as trichlorotrifluoroethane, benzotrifluoride, and hexafluoroxylene, but did not dissolve on shaking at room temperature in benzene, acetone, p-dioxane, N,N-dimethylformamide, or methyl chloroform.

An infrared spectrum of the polymer showed the expected absorption bands at 3.4 $\mu$ for C—H; C—F absorption between 7.5 and 9.3 $\mu$; C—O—C at 10 $\mu$, and a weak band at 2.7—2.9 $\mu$ which may be —OH end groups.

B. Using $AlCl_3$ as the catalyst yielded a 72 percent conversion to a clear, pale-yellow solid polymer with properties similar to those described in Part A.

C. Using $SbCl_5$ as the catalyst yielded a brown solid polymer in 80 percent conversion.

D. With $PCl_3$ as the catalyst, the polymer was obtained as a clear viscous oil, 14 percent conversion.

E. Using powdered KOH as the catalyst yielded a clear, slightly yellow solid polymer in 25 percent conversion.

EXAMPLE 3—COPOLYMERIZATION OF EPOXIDE-I AND HEPTAFLUOROISOPROPYL GLYCIDYL ETHER

A copolymerization was carried out in the manner as described for the homopolymerization in Example 2, Part A, using 0.4 c.c. of Epoxide-I, 0.16 c.c. of heptafluoroisopropyl glycidyl ether, and ca. 10 percent $FeCl_3$. A light-brown, semi-solid polymer was obtained in 20 percent conversion.

EXAMPLE 4—COPOLYMERIZATION OF EPOXIDE-I WITH PROPYLENE OXIDE

Into a 25ml., round-bottomed flask was placed 1.75 grams of Epoxide-I, followed by several drops of $SbCl_5$. The mixture was stirred by shaking for about 30 seconds; then 0.2 c.c. of propylene oxide was added. The mixture was heated on the steam bath for one-half hour. At the end of this time, volatiles were removed in a vacuum oven (80° C., 1 mm. Hg.). A viscous brown oil remained (1.6 grams). On addition of acetone, a phase separation occurred. Approximately 0.5 gram of solid polymer settled out; the residue remained in the acetone solution. Addition of 0.1 N HCl to the acetone solution caused the precipitation of the remainder of the polymer which was a viscous light-brown oil.

Contact angles of hexadecane and water on surfaces coated with these polymers indicated that a true copolymer existed in both cases, and that the oily copolymer contained a higher proportion of propylene oxide units than did the solid copolymer.

EXAMPLE 5—APPLICATION OF HOMOPOLYMER TO TEXTILES

Solutions in trichlorotrifluoroethane were prepared containing 1 percent and 5 percent of the homopolymer prepared as described in Example 2, Part A.

Swatches of undyed wool cloth and undyed cotton cloth were immersed in these solutions, taken out and pressed to remove excess solution, then cured in an oven at 150° C. for 10 minutes.

The products were tested for oil- and water-repellency. The results are tabulated below.

| Conc. of polymer in treating solution, % | Wool | | Cotton | |
|---|---|---|---|---|
| | Oil repellency | Water repellency | Oil repellency | Water repellency |
| 1 | 5 | 100 | 3 | 90 |
| 5 | 6 | 100 | 5 | 100 |
| 0 (Blank) | 0 | 50-60 | 0 | 0 |

EXAMPLE 6—APPLICATION OF HOMOPOLYMER TO TEXTILES

Solutions in trichlorotrifluoroethane were prepared containing 0.6 percent and 1.25 percent of the homopolymer prepared as described in Example 2, Part B.

Swatches of undyed wool and cotton fabrics were treated with the solutions and cured as described in Example 5. Oil repellency tests on the products gave the following data:

| Conc. of polymer in treating solution, % | Oil repellency, wool sample | Oil repellency, cotton sample |
| --- | --- | --- |
| 0.6 | 6 | 3 |
| 1.25 | 6 | 3 |
| 0 (Blank) | 0 | 0 |

EXAMPLE 7—APPLICATION OF COPOLYMER OF EPOXIDE I AND HEPTAFLUOROISOPROPYL GLYCIDYL ETHER TO TEXTILES

A solution in trichlorotrifluoroethane was prepared containing 5 percent of the copolymer described in Example 3. The solution was applied to undyed cotton and wool fabrics, and cured as described in Example 5. The products were tested for oil- and water-repellency. The results are tabulated below.

| Conc. of copolymer in treating solution, % | Wool | | Cotton | |
| --- | --- | --- | --- | --- |
| | Oil repellency | Water repellency | Oil repellency | Water repellency |
| 5 | 5 | 90 | 3 | 80 |
| 0 (Blank) | 0 | 50-60 | 0 | 0 |

EXAMPLE 8—APPLICATION OF COPOLYMER OF EPOXIDE I AND ETHYLENE OXIDE TO TEXTILES

A copolymer was prepared from Epoxide I and 25 mole percent of ethylene oxide, by heating the monomers in a sealed tube in the presence of $AlCl_3$ at about 100° C. for 2 hours. The copolymer was dissolved in trichlorotrifluoroethane to form a 3 percent solution.

A wool/polyester fabric (50/50) was treated with the copolymer solution, dried at room temperature, and cured at 120° C. for 10 minutes. Another swatch of the same fabric was treated with a 2 percent aqueous emulsion of a commercial oil-water repellent ("FC—208,"a product of 3M), and cured in the same manner as above.

Three drops of mineral oil were forced into each of the two treated fabric swatches. The swatches were then given a normal household wash using a commercial detergent ("Tide"), tumble dried, and examined for the presence of residual mineral oil. It was found that the fabric which had been treated with the copolymer of Epoxide I and ethylene oxide did not show any residual oil stain; the fabric treated with the commercial oil-water repellent still showed the presence of oil stain.

EXAMPLE 9—EMULSION OF HOMOPOLYMER AND ITS APPLICATION TO TEXTILES

An aqueous emulsion of the homopolymer of Epoxide I was prepared as follows:

Twenty grams of the polymer was dissolved in 40 ml. of 1,3-bis-(trifluoromethyl) benzene containing approximately 0.3 gram of an emulsifying agent (polyoxyethylene sorbitan oleate). A solution containing 88 ml. water, 12 ml. acetone, and 1 gram of the same emulsifying agent was stirred at low speed in a blender. The polymer solution was added slowly to the stirred liquid in the blender. After the addition had been completed, the rate of stirring was increased to full speed for 30 seconds. The resulting stock emulsion was then blended with additional water to provide several treating emulsions having a polymer concentration in the range of 1 to 5 percent.

Treatment of fabrics with these emulsions (in the manner described in Example 5) yielded products which displayed oil repellency essentially the same as had been obtained using the polymer dissolved in trichlorotrifluoroethane.

EXAMPLE 10—INVESTIGATION OF CONTACT ANGLES

Solutions in trichlorotrifluoroethane were prepared of several polymers of Epoxide I (as described below). The polymer concentration in each solution was approximately 2%. A few drops of each solution were applied to clean glass slides which were then placed in an oven (150° C.) for a few minutes to evaporate the solvent. After cooling to room temperature, contact angle measurements were made of droplets of water and n-hexadecane applied to the treated slides.

The contact angle is a measure of the repellency of the polymer. The larger the contact angle the more repellent the polymer is to the test liquid. Two test liquids were used to separately measure (a) the repellency of the polymers with respect to water, and (b) the repellency of the polymers with respect to an oily liquid, specifically n-hexadecane.

The polymers used and the results obtained are tabulated below:

| Polymer | Contact angle deg. | |
| --- | --- | --- |
| | n-hexadecane | water |
| Homopolymer of Epoxide I (Ex. 2A) | 65 | 105 |
| Copolymer of Epoxide I and heptafluoroisopropyl glycidyl ether (Ex. 3) | 62 | 60 |
| Copolymer of Epoxide I and propylene oxide (Ex. 4, oily copolymer) | 58 | 30 |

The above data is of particular interest as demonstrating that when Epoxide I is copolymerized with propylene oxide or the glycidyl ether, the resulting copolymers display a lower degree of hydrophobicity than the homopolymer, coupled with retention of essentially the same degree of oleophobicity as the homopolymer.

Having thus described the invention, what is claimed is:

1. A process for modifying a fibrous substrate which comprises:
   a. applying to the fibrous substrate a compound of the structure

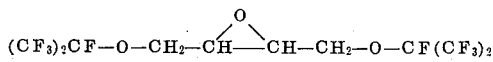

b. the said compound being applied in solution in an inert volatile solvent, and
   c. curing the so-treated fibrous substrate by heating it at a temperature about from 50° to 150° C.

2. A process for modifying a fibrous substrate which comprises:
   a. applying to the fibrous substrate a polymer having a skeletal chain containing recurring units of the structure

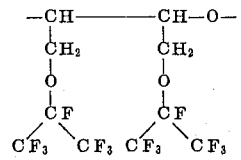

b. the said polymer being applied in solution in an inert volatile solvent, and
   c. curing the so-treated fibrous substrate by heating it at a temperature about from 50° to 150° C.

3. The process of claim 2 wherein the polymer additionally contains recurring units of the structure:

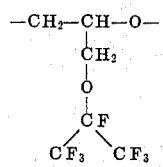

4. The process of claim 2 wherein the polymer additionally contains recurring units of the structure

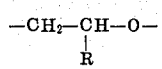

wherein R is a member of the group consisting of H and lower alkyl.

5. As an article of manufacture, fibrous material carrying a deposit of a polymer having a skeletal chain containing recurring units of the structure

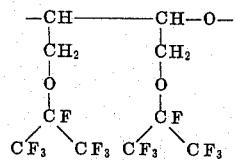

6. The article of claim 5 wherein the polymer additionally contains recurring units of the structure

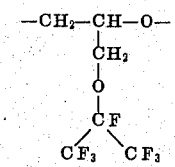

7. The article of claim 5 wherein the polymer additionally contains recurring units of the structure

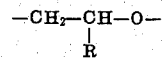

wherein R is a member of the group consisting of H and lower alkyl.

* * * * *